Sept. 23, 1930. A. HUGUENIN 1,776,317
STORAGE BATTERY TRACTION
Filed March 18, 1926 2 Sheets-Sheet 1
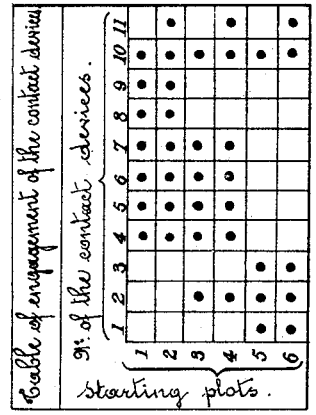
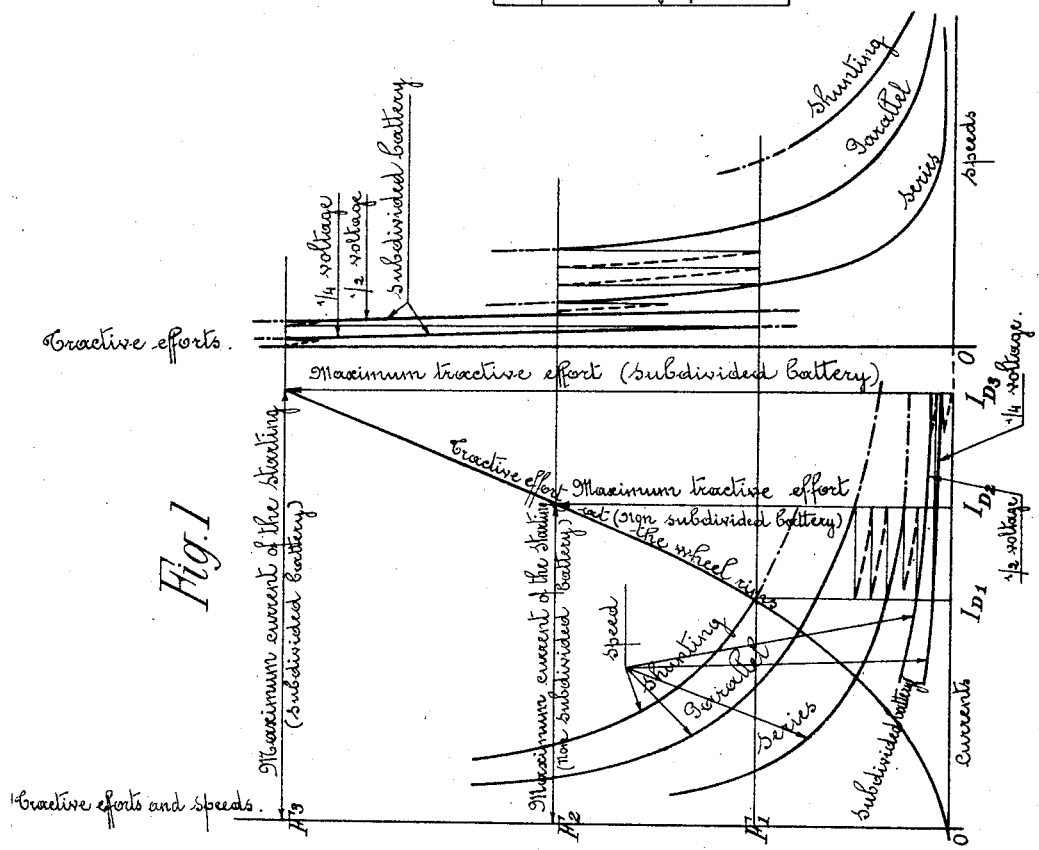
A. Huguenin
INVENTOR
By: Marks & Clark
Attys Sept. 23 1930. A. HUGUENIN 1,776,317
STORAGE BATTERY TRACTION
Filed March 18, 1926 2 Sheets-Sheet 2

A. Huguenin
INVENTOR

By: Marks & Clark
ATYS

Patented Sept. 23, 1930

1,776,317

UNITED STATES PATENT OFFICE

ALBERT HUGUENIN, OF PARIS, FRANCE

STORAGE-BATTERY TRACTION

Application filed March 18, 1926, Serial No. 95,705, and in France May 27, 1925.

Continuous current electric traction by overhead line or third rail, is subject to a great disadvantage from the fact that it employs a source of power at a constant voltage, and this offers serious inconveniences for the starting of the motors. Since the motors start from the position of rest, and hence without counter-E. M. F. resistances must be employed which will take up almost the whole of the tension of the line.

The only arrangement in practical use to overcome this drawback consists in the use of two motors (or other even number) which are first connected in series and are then connected in parallel when the counter-E. M. F. becomes sufficient. During the period of acceleration, the motors are operated almost exclusively upon resistance, so that the result will be a relatively great loss of energy.

Hitherto, only the single-phase traction systems could obviate this defect by the use of a transformer having multiple secondary terminals, so that the voltage on the motors can be increased during the entire starting period.

But in storage battery traction—which obviously applies exclusively to the continuous current system—the motor starting may be much improved.

The present invention relates to a method of storage battery traction wherein the motors are started by the successive use of increasing fractions or sections of the battery, so that the motors will be supplied at an increasing voltage.

The battery may be subdivided to any desired extent, but in practice I prefer to employ a subdivision into four sections, and the voltage on the motors is thus $\frac{1}{4}$ of the standard value, the voltage being then raised to $\frac{1}{2}$ and finally to the total amount.

By this method, I first diminish the loss of power to an appreciable degree, and secondly I obtain considerable tractive efforts during the starting period, but without attaining abnormal discharge currents for any of the cells of the battery.

The said invention has further for its object the combination, with the aforesaid subdivided battery and the motors, of an outfit comprising a suitable controller and a set of contact devices adapted to produce the necessary changes in the connections whereby the several sections of the battery will be placed in or out of circuit, while obviating all short-circuiting of the battery or other improper operations.

The appended drawings show by way of example an arrangement in accordance with the said invention.

Fig. 1 is a chart showing the functioning of the system.

Fig. 3 is a table of the interlocking combinations for an arrangement of contact devices.

Fig. 1 shows the diagram for the functioning of two motors which are supplied in accordance with the invention during the starting period. The curves clearly show the advantages inherent in my invention.

Figure 2:
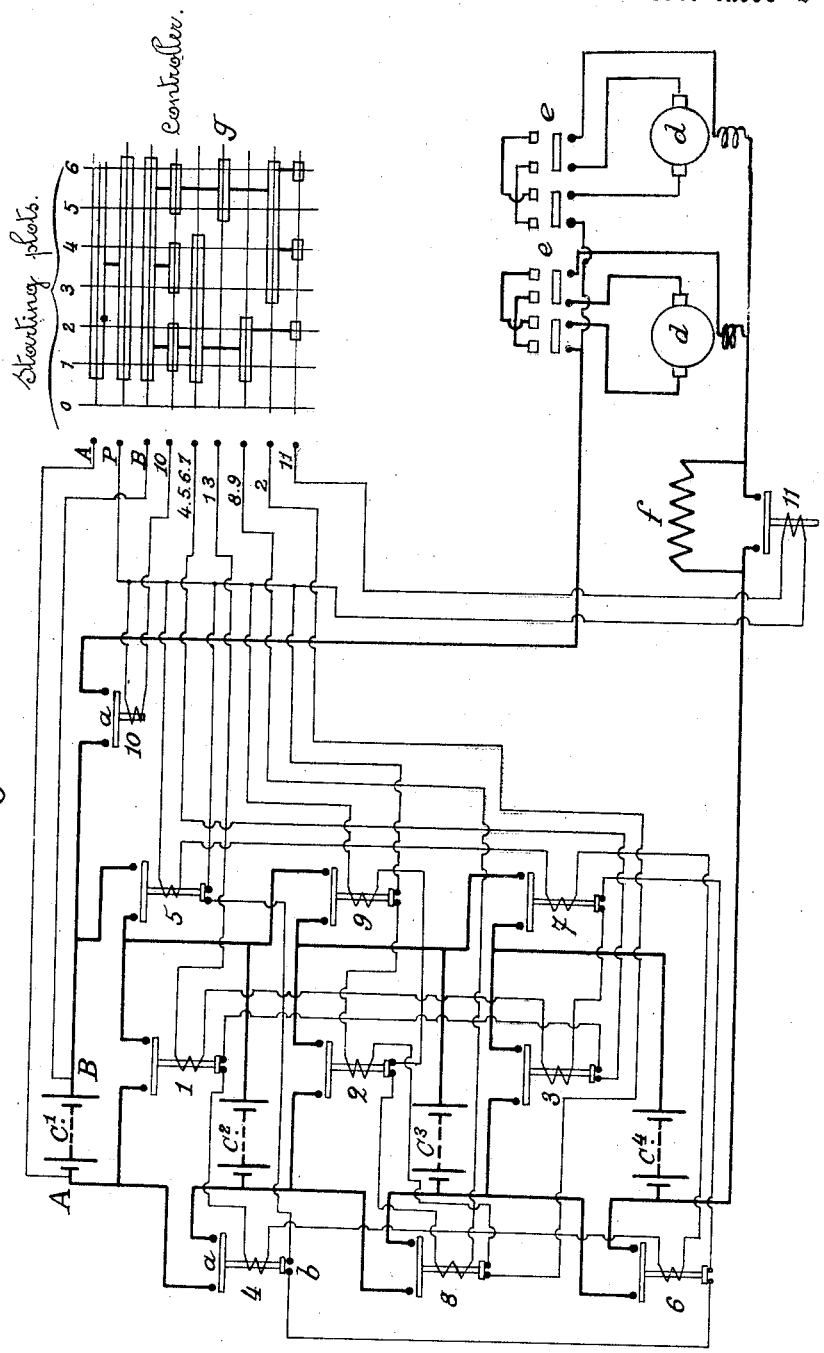
Fig. 2 is a diagram of the circuits.

The diagram on the left shows the efforts of traction at the wheel rim and the speed, relatively to the current in the motor. The diagram on the right shows the efforts of traction relatively to the speed of the vehicle.

During the last period of the starting, all the cells of the battery are in series, and the current in the motor is comprised between the values $I_{D1}$ and $I_{D2}$ corresponding respectively to the tractive efforts $F_1$ and $F_2$.

At the commencement of the starting, the value of the current in the motor may rise as far as $I_{D3}$ and the output for each battery cell will not exceed the normal value. This will afford a much greater tractive effort $F_3$.

The curve which is drawn (qualitatively) to scale shows the value of this tractive effort over what can be had without the use of the battery.

The parts in dotted lines in the diagrams correspond to periods of operating upon resistance. It will be noted that such periods are very short, and the loss of energy may be estimated at one-eighth of the energy lost without the use of the fractional method, and this figure clearly shows the great value of my said system.

The acceleration given to the motor when it is brought up to speed may be pushed as high as desired, the only limit being that the acceleration shall not be inconvenient for the passengers.

Due to the fact that the battery is divided into equal parts, all of the cells are operated at the same rate of discharge, which is great advantage.

Furthermore, this division of the battery allows me to push to the extreme limits the recovery of the kinetic energy of the train during the periods of reduced speed or braking, the battery being charged by the motors acting as dynamos until their E. M. F. becomes equal to $1/4$ the normal E. M. F. of the battery, in the case herein considered.

In practice, the division of the battery into four parts, for example, will provide for the recovery of energy as far as speeds of 4 or 5 kilometers per hour.

The two diagrams above indicated are completed by the curves corresponding to the shunting of a portion of the motor field for high speed and small tractive efforts, and this can obviously be performed more readily in the case of storage battery traction.

The arrangement may be carried out in such manner that when the battery is functioning, all danger of short-circuiting the battery will be obviated. Fig. 2 shows a disposition of circuits corresponding to such conditions; $c^1$ $c^2$ $c^3$ $c^4$ indicate four sections each comprising $1/4$ of the battery; $d$ is the motor, $e$ the reversing switch, $f$ the starting resistance; $g$ the controller, 1, 2 . . . 10, 11 are the contact pieces, the main contact being shown at $a$ and the auxiliary contact at $b$.

All the functioning operations are performed with the battery cut off from the motor; the contact device 10 makes or breaks the circuit; for this purpose the contacts of the controller corresponding to the contact device 10 have less width than the contacts corresponding to the other contact devices (Fig. 2). In this manner, upon changing the connections between the several parts of the battery and the motors, the circuit will be broken at the winding of the electro-magnet of the contact device 10 before it is broken at the corresponding windings of the other contact devices. The contact device 10 will thus be released before the others. In like manner, when the next coupling of the circuits is effected, the current is placed upon the winding of the contact device 10 after it has been placed upon the other contact devices; the contact device 10 will close the last, and the arc due to the closing of the circuit will be formed therein.

The said contact devices are operated upon an electric interlocking system, so that any one of the combinations of circuits can only be obtained on condition that the contact devices which were used in the preceding combinations have returned to the operative position.

The interlocking is an essential feature in order to obviate the short-circuiting of a portion of the battery. For instance if the contact devices 1 and 5 are closed at the same time, they will short-circuit the part $c^1$ of the battery. To avoid this accident, these two conductors are arranged on an electric interlocking system; the winding of the electro-magnet of the contact device 1 is connected in series with the auxiliary contact of the contact device 5, so that the contact device 1 can only close when the auxiliary contact of 5 is itself closed, i. e. when the contact device 5 is open. Inversely, the winding of the contact device 5 is in series with the auxiliary contact of the contact device 1, so that the contact device 5 can be closed only when the contact device 1 is open. In this manner, the devices 1 and 5 can not be closed at the same time.

All of the preceding considerations are applicable to the contact devices 1 and 4 which if simultaneously closed would short-circuit the sections $c^2$ of the battery, and for this reason these two contact devices are also interlocked.

The table given below indicates the electric interlocking which is necessary between the several contact devices:

Contact device 1;—interlocked with contact devices 4 and 5.

Contact devices 4 and 5—interlocked with contact device 1.

Contact device 3—interlocked with contact devices 6 and 7.

Contact devices 6 and 7—interlocked with contact device 3.

Contact device 2—interlocked with contact devices 8 and 9.

Contact devices 8 and 9—interlocked with contact device 2.

In Fig. 2, the contact device 1 is interlocked not only with devices 4 and 5 but also with 6 and 7; the contact device 3 is interlocked with 6 and 7 and also with 4 and 5. As shown in Fig. 3 which represents the series of combinations for the engagement of the contact devices, the devices 1 and 3 are always simultaneously opened and closed, so that they may be controlled at the same time, and thus their electro-magnet are connected in series and also their interlocking contacts. The same is true for the contact devices 4, 5, 6 and 7 whose windings are in series, and which are interlocked with 1 and 3.

The different starting operations will therefore be performed as follows:

When the controller is on the point 0, it will cut off all current from the circuits of the contact devices, and these devices are thus inoperative.

When the controller is on the point 1, the common terminal P of all the contact devices is supplied by the positive pole A of the ¼ section of the battery $c^1$ to which are connected the control circuits, while at the same time the negative pole B supplies in the first place the contact devices 4—5—6—7 and 8—9 which will first close and thus connect in parallel the four sections of the battery $c^1$ $c^2$ $c^3$ $c^4$, and it then supplies the contact device 10 connecting this battery to the motor.

With the controller on the point 2, this will supply the contact device 11 and will short-circuit the starting resistance $f$.

When the controller passes from point 2 to point 3, the contact device 10 is first opened, and then the devices 8 and 9 which are not to be used in the next combination, as well as the device 11; the device 2 is then closed; the combination of the battery in two parts in parallel ($c_1 + c_2$ and also $c_3 + c_4$) is thus effected. Finally, the device 10 is closed, so that the motor is again supplied.

With the controller on the point 4, the resistance $f$ is cut out, in the same manner as specified for the point 2. In the transfer from point 4 to point 5, the contact device 10 is first opened, and then the devices 4—5—6—7—11 which are not used in the next combination; the devices 1 and 3 are now closed, thus effecting the series combination of all the sections of the battery; finally, the contact device 10 is closed.

With the controller on the point 6, the resistance $f$ is again cut out; the starting operation is now terminated.

The reversing device $e$ may be controlled by hand, or by electro-magnets according to the current practice by multiple unit-traction.

Obviously, the aforesaid arrangement of circuits is given solely by way of example, and without departing from the principle of the invention I may employ any other suitable arrangement whereby the battery may be subdivided in the manner and for the purpose disclosed.

Having thus described my apparatus, what I claim as new therein, and my own invention, is:—

An arrangement for storage battery traction, comprising in combination, traction motors, a storage battery subdivided into sections, a controller, and a plurality of contact devices whereby the several sections of the battery will be placed in or out of the motor circuit, the said contact devices being actuated by means of the said controller and being electrically interlocked in the requisite order in such manner as to obviate all short-circuiting of the several sections of the battery, and a contact device interposed between the controller and the aforesaid contact devices and likewise under the control of the said controller whereby the battery will be entirely disconnected from the motors during the functioning of the aforesaid contact devices.

In testimony whereof I have hereunto affixed my signature.

ALBERT HUGUENIN.